US007914714B2

(12) United States Patent
Anchordoquy et al.

(10) Patent No.: US 7,914,714 B2
(45) Date of Patent: Mar. 29, 2011

(54) METHODS AND APPARATUS USING ELECTROSTATIC ATOMIZATION TO FORM LIQUID VESICLES

(75) Inventors: Thomas J. Anchordoquy, Lakewood, CO (US); Corinne Lengsfeld, Denver, CO (US); Kelly Brinkley, Ellicott City, MD (US); Ryan Jones, Colorado Springs, CO (US)

(73) Assignee: The Regents of the University of Colorado, Denver, CO (US)

( * ) Notice: Subject to any disclaimer, the term of this patent is extended or adjusted under 35 U.S.C. 154(b) by 743 days.

(21) Appl. No.: 10/555,432

(22) PCT Filed: May 14, 2004

(86) PCT No.: PCT/US2004/015151

§ 371 (c)(1), (2), (4) Date: Oct. 13, 2006

(87) PCT Pub. No.: WO2004/103510

PCT Pub. Date: Dec. 2, 2004

(65) Prior Publication Data

US 2007/0120280 A1 May 31, 2007

Related U.S. Application Data

(60) Provisional application No. 60/470,287, filed on May 14, 2003.

(51) Int. Cl.
*B01J 13/02* (2006.01)

(52) U.S. Cl. ................. 264/4.1; 428/402.2; 428/402.21; 428/402.24

(58) Field of Classification Search .................. 264/438, 264/437, 4.1, 9, 5, 4.32, 4.33; 424/489, 490, 424/450, 491, 497, 498; 425/5; 426/235, 426/72, 74, 276

See application file for complete search history.

(56) References Cited

U.S. PATENT DOCUMENTS 2,275,154 A 7/1940 Merrill et al.

(Continued)

FOREIGN PATENT DOCUMENTS

WO WO 02/060275 8/2002

(Continued)

OTHER PUBLICATIONS

Allen et al. (Mar. 19, 2004) "Drug Delivery Systems: Entering the Mainstream," *Science* 303:1818-1822.

(Continued)

*Primary Examiner* — James Seidleck
*Assistant Examiner* — S. Camilla Pourbohloul
(74) *Attorney, Agent, or Firm* — Greenlee Sullivan P.C.

(57) ABSTRACT

The methods of the invention employ electrostatic atomization to form a compound droplet of at least two miscible fluids. The compound droplet comprises a core of a first fluid and a layer of a second fluid completely surrounding the core. The first fluid contains the agent to be encapsulated and the second fluid contains an encapsulating agent. The first and second liquids are miscible. The encapsulated droplets can contain a variety of materials including, but not limited to, polynucleotides such as DNA and RNA, proteins, bioactive agents or drugs, food, pesticides, herbicides, fragrances, antifoulants, dyes, oils, inks, cosmetics, catalysts, detergents, curing agents, flavors, fuels, metals, paints, photographic agents, biocides, pigments, plasticizers, propellants and the like and components thereof. The droplets can be encapsulated by a variety of materials, including, but not limited to, lipid bilayers and polymer shells. An additional complete or partial layer of a third fluid can be formed on the outside of the second fluid layer. The third fluid can contain a targeting or steric stabilizing agent.

26 Claims, 6 Drawing Sheets

U.S. PATENT DOCUMENTS

| | | | |
|---|---|---|---|
| 2,766,478 | A | 10/1951 | Raley, Jr. et al. |
| 3,015,128 | A | 1/1962 | Somerville, Jr. |
| 3,310,612 | A | 3/1965 | Somerville, Jr. |
| 3,389,194 | A | 6/1968 | Somerville |
| 5,122,670 | A | 6/1992 | Mylchreest et al. |
| 5,393,975 | A | 2/1995 | Hail et al. |
| 6,103,271 | A * | 8/2000 | Morrison et al. ............ 424/490 |
| 6,143,211 | A | 11/2000 | Mathiowitz et al. |
| 6,234,402 | B1 * | 5/2001 | Ganan-Calvo ................... 239/8 |
| 6,399,362 | B1 | 6/2002 | Pui et al. |
| 6,405,936 | B1 | 6/2002 | Ganan-Calvo |
| 6,719,933 | B2 | 4/2004 | Nakamura et al. |
| 2002/0007869 | A1 * | 1/2002 | Pui et al. ........................ 141/173 |
| 2003/0066969 | A1 | 4/2003 | De La Mora et al. |
| 2004/0069632 | A1 | 4/2004 | Ripoll et al. |

FOREIGN PATENT DOCUMENTS

| | | |
|---|---|---|
| WO | WO 02/060591 | 8/2002 |
| WO | WO 2004/103510 | 12/2004 |

OTHER PUBLICATIONS

Bangham et al. (1965) "Diffusion of Univalent Ions Across the Lamellae of Swollen Phospholipids," *J. Mol. Biol.* 3:238-252.

De Juan et al. (1997) "Charge and Size Distributions of Electrospray Drops," *J. Colloid Int. Sci.* 186:280-293.

Disher et al. (May 14, 1999) "Polymersomes: Tough Vesicles Made from Diblock Copolymers," *Science* 284:1143-1146.

Felgner et al. (Nov. 1987) "Lipofection—A Highly Efficient, Lipid-Mediated DNA Transfection Procedure," *Proc. Natl. Acad. Sci. USA* 84(21):7413-7417.

Ganan-Calvo, A.M. (Jan. 12, 1998) "Generation of Steady Liquid Microthreads and Micron-Sized Monodisperse Sprays in Gas Streams," *Phys. Rev. Lett.* 80(2):285-288.

Ganan-Calvo, A.M. (1997) "On the Theory of Electrohydrodynamically Driven Capillary Jets," *J. Fluid Mechanics* 335:165-188.

Ganan-Calvo, A.M. (1999) "The Surface Charge in Electrospraying: its Nature and its Universal Scaling Laws," *J. Aerosol Sci.* 30(7):863-872.

Gao et al. (1996) "Protein of Cationic Liposome-Mediated Gene Delivery by Polycations," *Biochem.* 35:1027-1036.

Gregoriadis, G. (1995) "Engineering Liposomes for Drug Delivery: Progress and Problems," *Tibtech* 13:527-537.

Hofland et al. (Jul. 1996) "Formation of Stable Cationic Lipid/DNA Complexes for Gene Transfer," *Proc. Natl. Acad. Sci. USA* 93(14):7305-7309.

International Search Report, Corresponding to International Application No. PCT/US04/15151, Mailed Oct. 28, 2005.

Lasic et al. (1995) "Transmembrane Gradient Driven Phrase Transactions within Vesicles: Lessons for Drug Delivery," *Biochim. Biophys. Acta* 1239:145-156.

Lengsford et al. (Jun. 2003) "Pulmonary Gene Delivery: Impact of Aerosolization Method on Bioactivity," *J. Aerosol Med.* 16(2):196.

Lesney, M.S. (2001) "Going Cellular," *Modern Drud Discovery* 4(3):45-46,49,50.

Lopez-Herrera et al. (May 2003) "Coaxial Jets Generated from Electrified Taylor Cones. Scaling Laws," *J. Aerosol. Sci.* 34(5):535-552.

Loscertales et al. (Mar. 1, 2002) "Micro/Nano Encapsulation via Electrified Coaxial Liquid Jets," *Science* 295:1695-1698.

Nicolazzi et al. (Mar. 26, 2003) "Anionic Polyethyleneglycol Lipids Added to Cationic Lipoplexes Increase their Plasmatic Circulation Time," *J. Cont. Release* 88(3):429-443.

Regele et al. (Nov. 2002) "Effects of Capillary Spacing on EHD Spraying from an Array of Cone Jets," *J. Aerosol Sci.* 33(11):1471-1479.

Rickard et al. (2002) "Experimental Study of a Hybrid Electrohydrodynamic, Air-Assisted Liquid Atomizer, SAE Document No. 2002-01-2754," Presented at: SAE Powertrain & Fluid Systems Conference & Exhibition, Oct. 2002, San Diego, Ca, USA.

Rosell-Lompart et al. (1994) "Generation of Monodisoerse Droplets 0.3 to 4 µm in Diameter from Electrified Con-Jets of Highly Conducting and Viscous Liquids," *J. Aerosol. Sci.* 25(6):1093-1119.

Semple et al. (2001) "Efficient Encapsulation of Antisense Oligonucleotides in Lipid Vesicles Using Ionizable Aminolipids: Formation of Novel Small Multimellar Vesicle Structures," *Biochim. Biophys. Acta* 1510:152-166.

Uchengbu et al. (1998) "Polymeric Chitosan Based Vesicles for Drug Delivery," *J. Pharm. Pharmacol.* 50:453-458.

Uchengbu et al. (1998) "Polymeric Vesicles from Amino Acid Homopolymers," *Proc. Int. Symp. Control. Release Bioact. Mater.* 25:186-187.

Uchegbu et al. (1999) "Parental Drug Delivery: 1," *Pharm. J.* 263:309-318.

Yamaguchi et al. (Jun. 17, 2002) "Insulin-Loaded Biodegradable PLGA Microcapsules: Initial Bursat Release Controlled by Hydrophilic Additives," *J. Cont. Release* 81(3):235-249.

Chen et al. (2000) "A Novel Approach for Introducing Bio-Materials into Cells," *J. Nanoparticle Res.* 2:133-139.

Mei et al. (Web Release Oct. 3, 2007) "Investigation of Compound Jet Electrospray: Particle Encapsulation," *Physics of Fluids* 19:103303.

Mei et al. (2008) "Operational Modes of Dual-Capillary Electrospraying and the Formation of the Stable Compound Cone-Jet Mod," *Aerosol Air Quality Res.* 8(2):218-232.

Oliver et al. (May 2005) "Two Fluid VOF Simulation of Droplet Impact on a Liquid Pool," *ILASS Americas, 18th Annual Conference on Liquid Atomization and Spray Systems*, Irvine, CA.

Written Opinion, Corresponding to International Application PCT/US2004/015151, Mailed Oct. 28, 2005.

* cited by examiner

METHODS AND APPARATUS USING ELECTROSTATIC ATOMIZATION TO FORM LIQUID VESICLES

CROSS-REFERENCE TO RELATED APPLICATIONS

This application is the National Stage of International Application No. PCT/US2004/015151, filed May 14, 2004, which claims the benefit of claims priority from U.S. Provisional Application No. 60/470,287, filed May 14, 2003, which is hereby incorporated by reference to the extent not inconsistent with the disclosure herein.

BACKGROUND OF THE INVENTION

This invention is in the field of encapsulation, in particular methods and apparatus for encapsulation of liquid droplets. The methods of the invention employ electrostatic atomization to form a compound droplet from at least two miscible fluids. The compound droplet comprises a core of a first fluid and a layer of a second fluid completely surrounding the core. The first fluid contains an agent to be encapsulated and the second fluid contains an encapsulating agent.

Encapsulation is used in a variety of well-known applications such as scratch-and-sniff perfumes, carbonless copy paper, laundry detergent, packaged baking mixes, and pharmaceutical drugs for taste masking and sustained release. Commercial techniques for encapsulation include complex coacervation, co-extrusion, interfacial polymerization, desolvation and various coating techniques. Since the 1930s, a number of variations to the emulsion encapsulation technique have evolved. Mathiowitz et al (U.S. Pat. No. 6,143,211) describe a process for preparing microparticles through phase inversion.

Several encapsulation methods involve flow of two liquids through concentric orifices to form a droplet within a droplet, which can also be called a compound droplet. Merrill et al. (U.S. Pat. No. 2,275,154) describes compound droplets formed by gravity. Raley et al. (U.S. Pat. No. 2,766,478) describe compound droplets formed by a combination of gravity and a slight pneumatic pressure. Somerville describes compound droplets formed by a centrifugal encapsulating apparatus (U.S. Pat. No. 3,015,128 and U.S. Pat. No. 3,310,612). Somerville also describes compound droplets formed by extruding concentrically arranged fluid rods of film and filler material into a stream of carrier fluid. The speed of the carrier fluid is selected to cause the rod to elongate and break up into segments which form into individual particles (U.S. Pat. No. 3,389,194). Ganna-Calvo describes methods for manufacturing coated droplets in which a gas focuses two concentrically positioned immiscible streams to a stable unified jet which flows out of the chamber exit orifice and breaks up into coated particles (U.S. Pat. No. 6,405,936). Methods for forming compound droplets from two immiscible or poorly miscible fluids have also been described where the droplets are formed by dissociation of stable electrified coaxial jets (WO 02/060591, Loscertales. I. G. et al., March 2002, Science, 295, 1695-1698, and US Patent Application Publication Number 2004/0069632).

Concentric orifice configurations have also been used to form electrosprays for mass spectrometry applications. Mylchreest et al. describe an electrospray ion source in which the liquid sample is sheathed with a sheath liquid (U.S. Pat. No. 5,122,670).

Liposomes encapsulating an aqueous core have been proposed for drug delivery and gene therapy. The ability of phospholipids to self-assemble into bilayers enclosing an aqueous core ("liposomes") was first described by Bangham almost four decades ago (Bangham et al., 1965). The development of liposomes as potential drug delivery vehicles was intensely studied in the 70s and 80s, and several liposome-based products are currently on the market (Gregoriadis, 1995). Of these products, only three consist of water-soluble drugs that are encapsulated within the lipid envelope. Although liposomes have been formulated such that a long circulating half-life is achieved, the encapsulation of drugs within the lipid bilayer can be inefficient. Typical encapsulation procedures involve the rehydration of a dried lipid film with a drug-containing solution such that drug is encapsulated upon vesicle formation. This traditional approach yields encapsulation efficiencies of <10%, with the bulk of the drug remaining outside of the liposome (Semple et al., 2001). The removal of the unencapsulated drug is labor-intensive, costly, and results in substantial losses of both drug and lipid. Encapsulation efficiency can be improved by utilizing a pH gradient and taking advantage of drugs that will partition across the membrane and become entrapped within the acidified interior of the liposome (Lasic et al., 1995). Unfortunately, separation of the unencapsulated drug from the loaded liposomes is still problematic, and this approach is not applicable to macromolecular therapeutics that cannot penetrate the bilayer.

One aspect of gene delivery that has been shown to have a major effect on therapeutic gene delivery in vivo is the maintenance of DNA integrity in physiological fluids. More specifically, it has been demonstrated that the destabilization of non-viral vectors in serum causes the exposure of DNA to nucleases (Li et al., 1999). As a result, DNA is rapidly degraded in the blood, thereby preventing it from providing any therapeutic benefit.

This problem has stimulated interest in identifying lipid formulations that bind very strongly to DNA in order to maintain the therapeutic gene in a complex that is resistant to nuclease degradation (Li et al., 1999). However, studies have clearly shown that gene expression cannot occur unless the bound lipid is removed to allow transcription in the nucleus (Zabner et al., 1995; Pollard et al., 1998). Therefore, the use of cationic lipids to prevent DNase degradation can result in a very stable complex that does not disassociate in the intracellular environment, and ultimately inhibits therapeutic gene expression (Oupicky et al., 2002). In an effort to circumvent this dilemma, some researchers have synthesized cationic vectors possessing chemical linkages that can be degraded in an intracellular environment (Bulmus et al., 2003; Dauty et al., 2001). In this way, the vector remains intact in blood to maintain DNA integrity, but dissociation is aided by enzymatic degradation within the cell to allow gene expression.

The problems with encapsulating negatively-charged macromolecules within traditional liposomes stimulated Felgner et al. (1987) to utilize cationic liposomes in an effort to improve the efficiency of DNA encapsulation. This landmark study revolutionized gene delivery, and stimulated the use of cationic lipids in synthetic vectors. However, subsequent studies have clearly shown that true encapsulation is rarely achieved under these conditions, but that an ionic interaction of the DNA with the cationic liposomes causes the formation of a lipid-DNA complex that is ultimately responsible for gene delivery.

Another factor that must be considered when administering vectors in vivo is the interaction with various components in physiological solutions. For example, it is well known that non-viral vectors bind with serum proteins upon IV injection (Yang and Huang, 1997; Dash et al., 1999; Faneca et al., 2002; Opanasopit et al., 2002; Trubetskoy et al., 2003). Furthermore, it has been shown that the binding of serum components causes aggregation in vivo, which decreases the circulation half-life of the vector (Dash et al., 1999; Oupicky et al., 2002). Some studies have taken advantage of the vector aggregation to enhance gene delivery to the lung (Li et al., 1999; Barron et al., 1999; Li and Huang, 2000; Liu and Huang, 2002), but safety concerns and the inability to target other tissues limit the potential applications of this approach. Other researchers have attempted to incorporate high levels of steric stabilizers and targeting ligands to prolong circulating half-lives (Choi et al., 1998; Fajac et al., 1999; Ogris et al., 1999; Tam et al., 2000; Oupicky et al., 2002). Although this approach has been successfully utilized for liposome-based pharmaceuticals and appears to be effective at increasing circulation lifetimes (Papahadjopoulos et al., 1991; Torchilin et al., 1994), studies have also shown that the incorporation of polyethylene glycol (PEG)-conjugated components into vectors disrupts normal cellular processing and ultimately reduces transfection rates (Harvie et al., 2000).

Polymeric vesicles formed from amphiphilic polymers have also been proposed as drug delivery vehicles. Amphiphilic polymers proposed for polymeric vesicles include diblock copolymers of polyethyleneoxide-polyethylene (Discher, B. M. et al. (1999) "Polymerosomes: Tough Vesicles Made from Diblock Copolymers", Science, 284: 1143-1146), carbohydrate-based polymers based on chitosan (Uchegbu, I. F. et al., (1998) "Polymeric chitosan based vesicles for drug delivery. J. Pharm. Pharmacol., 50, 453-8) and amino acid based polymers (Uchegbu, I. F. et al., (1998) "Polymeric vesicles from amino acid homopolymers", Proc. Intl. Symp. Control. Rel. Bioact. Mater. 25, 186-7).

SUMMARY OF THE INVENTION

The invention provides methods and apparatus for making encapsulated droplets. The encapsulated droplets can contain a variety of agents to be encapsulated including, but not limited to, polynucleotides such as DNA and RNA, chemically modified polynucleotides, polynucleotide complexes, proteins, bioactive agents, food, pesticides, herbicides, fragrances, antifoulants, dyes, oils, inks, cosmetics, catalysts, detergents, curing agents, flavors, fuels, metals, paints, photographic agents, biocides, pigments, plasticizers, propellants and the like and components thereof. The droplets can be encapsulated by a variety of materials, including, but not limited to, lipid bilayers and polymer shells.

Applications of the encapsulated droplets made by the methods of the invention include, but are not limited to, polynucleotide delivery. The methods of the invention can completely encapsulate DNA (either naked or condensed) within liposomes and potentially circumvent problems associated with DNase susceptibility, cationic lipid toxicity, complement activation, serum-induced aggregation, vector dissociation, and "first pass" elimination in the liver and lungs (Devine et al., 1994, Plank et al., 1996; Yew et al., 2001).

Furthermore, the individual assembly of each vector via electrostatic spraying results in a narrow particle size distribution with a lower limit on droplet size below 500 nm (note most conventional atomization techniques have a 5 to 7 μm limit). Previous studies that produce vectors by traditional methods (i.e., the mixing of separate solutions containing the various components) have demonstrated that fractionation of the heterogeneous particle preparation yields a small population of vectors with very high transfection efficiency (Hofland et al., 1996; Gao and Huang, 1996). Therefore, the relatively homogeneous preparation of vectors produced by electrostatic co-extrusion can be prepared with more uniform physicochemical properties that can be systematically optimized for maximum serum stability and transfection activity.

Efficient encapsulation procedures that allow elimination of cationic lipids from the vector also reduce the interaction with serum components and minimize the need for steric stabilization via PEGylation (Nicolazzi et al., 2003). Indeed, several liposome-based pharmaceuticals that are currently on the market achieve adequate circulation lifetimes without steric stabilization by utilizing neutral and anionic lipids that only weakly interact with serum components (e.g., DaunoXome®, Abelcet®, AmBiosome®).

If steric stabilization via PEGylation is employed with the methods of the invention, the drawbacks of steric stabilization by PEGylation may be minimized. In the methods of the invention, the DNA is not physically bound to the PEGylated lipid, but can be reliably entrapped within the aqueous compartment of a PEGylated liposome. For example, if the lipid "coat" containing the PEG is not electrostatically bound to the DNA, steric stabilization may be achieved in the circulation, but PEGylated components may be readily dissociated from the transgene to facilitate transfection.

The electrostatic co-extrusion technique can be applied broadly to any situation where high encapsulation and consistent particle characteristics are desirable. The potential advantages for the manufacture of polymer-encapsulated micro- and nanospheres are significant, and certain drugs (e.g., insulin) have an absolute requirement for a low burst release that is dependent upon complete encapsulation (Yamaguchi et al., 2002). In addition to drug delivery applications, the ability to efficiently encapsulate high concentrations of proteins within a lipid membrane offers the potential to solve many of the problems associated with the development of artificial blood. More specifically, conventional methods for hemoglobin encapsulation do not permit the high protein concentrations needed to simulate that found in red blood cells, and the inability to produce consistently small "particle" sizes (200-300 nm) continues to limit the development of liposome-encapsulated hemoglobin (LEH), despite its distinct advantages over other non-encapsulated technologies (Riess, 2001).

The process for making the encapsulated droplets uses electrostatic atomization to form a compound droplet. The compound droplet comprises a core of a first fluid and a layer of a second fluid completely surrounding the core. The compound droplet may comprise one or more additional layers completely or partially surrounding the layer of second fluid. The first fluid can either dissolve or suspend the agent to be encapsulated and can be aqueous. The second fluid can either dissolve or suspend the encapsulating agent and is selected so that it is miscible with the first fluid. The electrostatic atomization requires that at least one of the fluids has sufficient electrical conductivity.

A two-fluid compound droplet is formed as follows. The first and second fluids are pumped through concentric flow channels such that the first fluid flows through the inner flow channel. The two fluids exit the flow channels through concentric orifices. Laminar flow conditions are preferred, so that the first and second fluids are separated by an interface upon exiting the orifices. An electrical potential difference is applied to the apparatus such that that a structured Taylor cone is formed where the second liquid surrounds the first fluid. A coaxial jet is emitted from the Taylor cone. This coaxial jet then breaks up into compound droplets of a first fluid surrounded by a layer of second fluid.

After each compound droplet is formed, the encapsulating agent present in the layer of second liquid forms an encapsulating coating or shell. In an embodiment, the shell forms through at least partial removal of the second liquid. In this embodiment, enough of the second liquid is removed from the liquid environment around the encapsulating agent that the encapsulating agent no longer remains in solution. For example, phospholipid encapsulating agents can form a lipid bilayer as the liquid environment around the encapsulating agent becomes sufficiently aqueous. The change in liquid environment around the encapsulating agent can occur as the second liquid evaporates from the droplet, or through interdiffusion of the liquids, or through a combination of these factors. In a different embodiment, the encapsulating agent forms a shell through cross-linking of the encapsulating agent, e.g. through photoirradiation.

In an embodiment, the invention provides electrostatic atomization apparatus with arrays of nozzles for formation of compound droplets.

DETAILED DESCRIPTION OF THE INVENTION

The invention provides methods for making encapsulated droplets through electrostatic atomization of at least a first and a second fluid, the first fluid comprising the agent to be encapsulated and the second fluid comprising the encapsulating agent. As used herein, electrostatic atomization is a technique in which electrostatic forces aid in the generation of fine liquid droplets. The particular form of electrostatic atomization used in the methods of the invention may also be termed electrostatic co-extrusion, since it involves co-flowing fluids through coaxial flow channels, having coaxial orifices.

Figure 1:
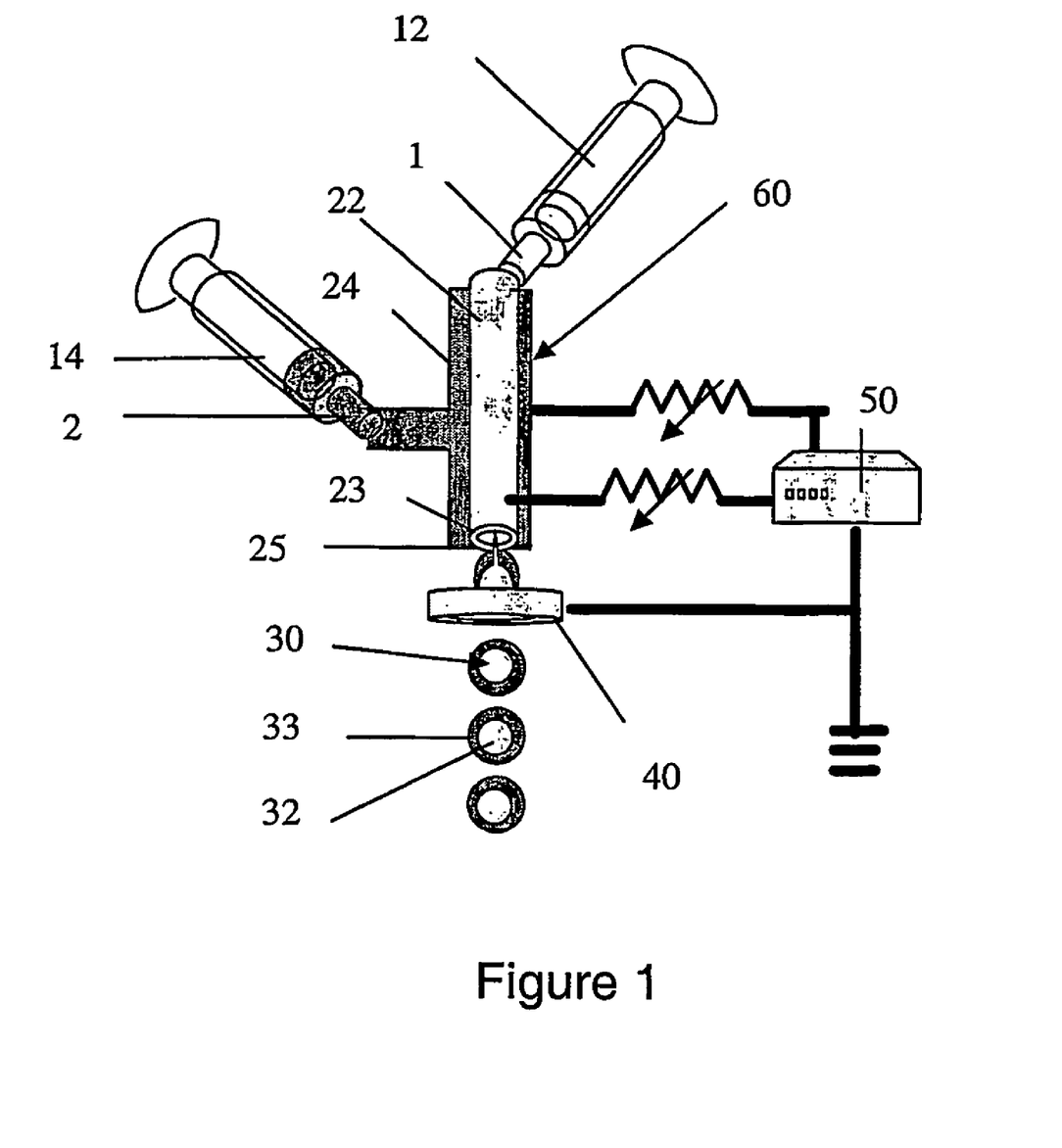
FIG. 1 schematically illustrates an experimental configuration of the electrostatic atomization system.
Figure 2:
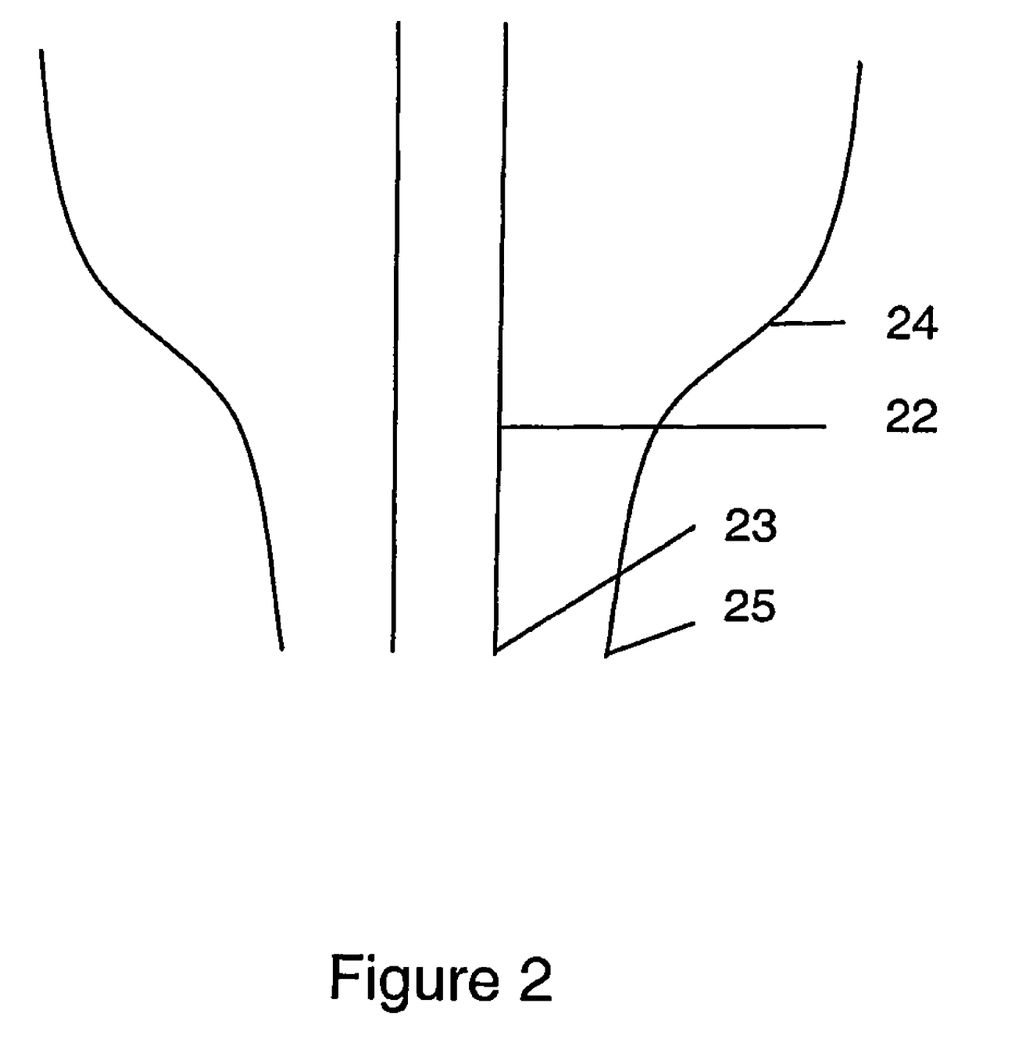
FIG. 2 schematically illustrates a cross-section of the flow channels of an electrostatic atomization system.

In an embodiment, the method comprises the steps of:
a. forming a compound droplet through electrostatic atomization of a first and a second liquid, the compound droplet comprising a droplet of the first liquid surrounded by a layer of the second liquid, wherein the first liquid comprises an agent to be encapsulated, the second liquid comprises an encapsulating agent, the second liquid comprises an encapsulating agent and is miscible with the first liquid and at least one of the first or second liquid is electrically conductive; and b. forming an encapsulating shell from the encapsulating agent, thereby forming an encapsulated droplet comprising an agent to be encapsulated.

FIG. 1 shows a schematic of an electrostatic atomization apparatus. The major components include a flow channel assembly 60. The flow channel assembly 60 comprises two concentric flow channels, a first, inner flow channel 22 and a second, outer flow channel 24 with concentric lower orifices 23 and 25. A first pump 12 supplies a controlled flow of the inner fluid 1 through the inner flow channel 22. Similarly, a second pump 14 delivers a controlled flow of the outer fluid 2 through the outer flow channel 24 in the annular space between the inner (first) and outer (second) flow channels 22, 24. The inner and outer fluids are simultaneously extruded at the lower orifices of the flow channels 22, 24. The lower orifices of the flow channels may be said to form the outlet of a nozzle. The inner or first fluid contains the agent to be encapsulated, and the outer or second fluid contains the encapsulating agent. In FIG. 1, the flow channels are shown as capillary tubes of constant cross-section. The diameter of the orifices is sufficiently small that droplet formation occurs through electrospray rather than gravity driven dripping. The diameter of the flow channels need not be of constant cross-section. For example, the walls of the flow channels may converge as they approach the orifice or outlet. Furthermore, the apparatus can be configured with additional coaxial flow channels to produce compound droplets with additional layers (e.g. a third coaxial flow channel surrounding the second flow channel for formation of a third layer). Electrostatic atomization apparatus suitable for use with the invention may be operated at atmospheric pressure or under vacuum.

In the embodiment shown in FIG. 1, both the first and second fluid are given an electric charge by transferring current from a high voltage power supply 50 through an electrode (e.g., a metal tube) in contact with the fluid. The current is drawn into the fluid by using an electrical ground electrode 40 (e.g., a plate or hoop) placed downstream of the capillary exits. For a fluid to be given an electric charge in this manner, the fluid must be sufficiently electrically conductive. As used herein, an electrically conducting fluid is sufficiently conductive that the fluid can be given an electrical charge in this manner. The required fluid conductivity depends in part on the density of the fluid. In an embodiment, fluid conductivities of greater than about $1\times10^{-9}$ ($cm^{-1}$ $Ohms^{-1}$) are sufficiently conductive.

In FIG. 1, the potential applied to both flow channels is the same. However, variable resistors can be used to manipulate the potential applied to each flow channel, and thus the current applied to each fluid. In this embodiment, the fluid streams are electrically insulated from each other while in the flow channels. In other embodiments, only the first or the second fluid can be given an electric charge.

In an embodiment, the flow channels are negatively charged.

In one embodiment, the ground plate 40 is placed approximately 10 mm below the capillary orifices. The ground plate distance can vary from about 1 mm to about 50 mm, depending on the applied voltage, flow rates, fluid properties, and the desired droplet size.

The potential difference between the charged fluid(s) and the ground plate 40 pulls the fluid(s) down, opposing surface tension and accelerating liquid column breakup. If only one fluid is charged, the motion of that fluid pulls on the fluid in the other flow channel. For example, if only the inner or first fluid is charged, the motion of the inner fluid pulls on the fluid in the outer capillary causing it to become encased. In an embodiment, the voltage used to drive the process ranges between about four and about six thousand volts (depending on flow channel orifice-to-ground distance).

As used herein, one fluid is miscible in another if it is at least partially able to mix with or dissolve into the other fluid. The first and second fluids may be partially or completely miscible with each other. In an embodiment, the first and second fluids are not poorly miscible with one another. It has been found that miscible fluids can require more care than immiscible systems in establishing well behaved Taylor cones. It is important to maintain laminar flow of miscible fluids as they exit the flow channels. The flow behavior of the fluids depends upon the fluid flow rates, with lower flow rates being more conducive to laminar flow. Stable interfaces are more likely and better results will be obtained if the velocity profiles are similar across the exits of all geometries. In an embodiment, the velocity profiles are substantially uniform across the exits of all geometries. Laminar flow is also more likely to be obtained if the velocity fields of the inner and outer fluids are similar to one another. In an embodiment, the velocity fields of the inner and outer fluids are matched. The flow behavior also depends upon the configuration of the outlets of the flow channels. Preferably, the outlet of the inner flow channel is flush or downstream of the outlet of any surrounding flow channels. In an embodiment, the outlet of the inner flow channel projects less than about 2 mm from the outlets of any surrounding flow channels. In addition, the shape of the flow channel walls can affect the flow behavior. In an embodiment, the walls of the second flow channel converge near the outlet of that flow channel, as illustrated schematically in FIG. 2. In another embodiment, the walls of both the first and second flow channel converge near their respective outlets.

The droplet size is a function of the liquid properties, flow rate, and applied charge. Previous research on the formation dynamics and characterization of aerosols from electrostatic sprays indicate the expected versatility in the particle size produced by this technique ranges from hundreds of microns to tens of nanometers (Gana-Calvo, 1997; Canna-Calvo, 1999; De Juan and de la Mora, 1997; Rosell-Llompart and de la Mora, 1994). The size of simple droplets (i.e. not compound droplets) can be predicted using a universal scaling law where the droplet diameter (d) is largely a function of flow rate (Q), fluid density (ρ), fluid conductivity (K), and surface tension (γ):

$$d = \frac{2.9}{\pi^{1/3}} \left[ \frac{\varepsilon_o \rho}{K \gamma} \right]^{1/6} Q \quad \text{(Equation 1)}$$

where $\varepsilon_o$ is the permittivity of a vacuum

Figure 3:
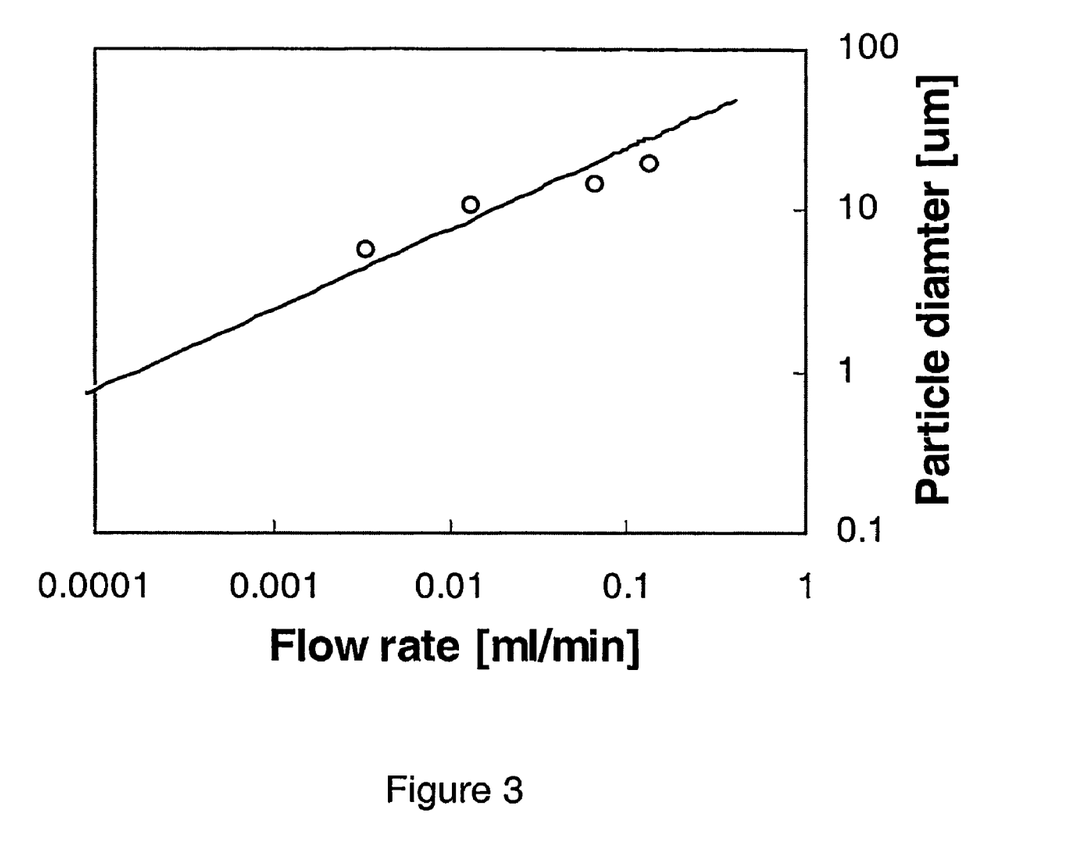
FIG. 3 illustrates the predicted (line) and experimentally observed (dots) variation of methanol droplet diameter with liquid flow rate at atmospheric temperature and pressure.
Figure 4:
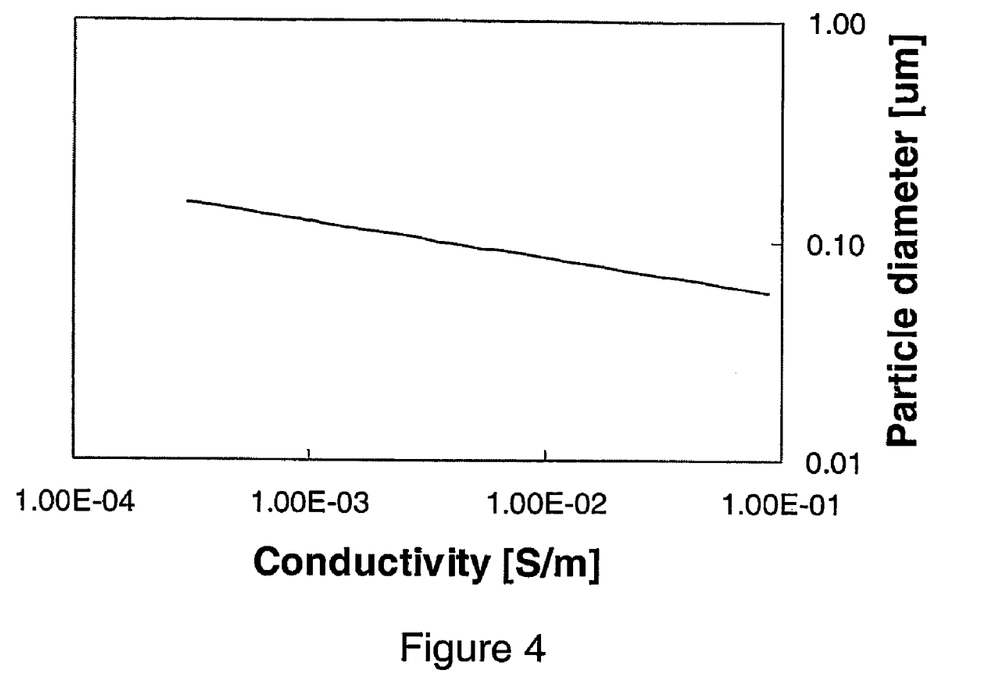
FIG. 4 illustrated the predicted variation of water droplet diameter with liquid conductivity at atmospheric temperature and pressure.

FIGS. 3 and 4 demonstrate the impact of flow rate and conductivity on the diameter of simple droplets formed at atmospheric temperature and pressure. Although flow rate appears more than adequate to form particles well into the submicron range, current experimental observations report a lower limit of approximately half a micron in diameter. This occurs because standard syringe pumps operating under extremely low flow rates can produce unsteady, pulsating flows that negate several of the assumptions used to produce these theoretical curves. As a result, the production of particles smaller than half a micron may require manipulation of other factors in addition to flow rate. Experimentally, it is easy to alter the solution conductivity by adding salts to the solution and thereby reduce droplet size (the presence of polynucleotides and condensing agents will also increase conductivity and therefore aid in achieving small particle sizes). FIG. 4 demonstrates that particle sizes down to the 100 nm range are feasible if we account for the conductivity changes arising from moderate increases in salt or DNA concentration within the aqueous core. For example, the conductivity from physiological saline (150 mM NaCl) is approximately 0.016 S/m resulting in a theoretical particle size of 83 nm according to these calculations (FIG. 4).

The compound droplets 30 formed through electrostatic atomization comprise a core 32 of a first fluid and a layer 33 of a second fluid completely surrounding the core. The compound droplet may comprise one or more additional layers completely or partially surrounding the layer of second fluid.

After the compound droplets are formed, the encapsulating agent present in the layer of second liquid forms an encapsulating coating or shell. In an embodiment, the shell forms as the liquid environment around the encapsulating agent becomes sufficiently aqueous that the encapsulating agent no longer remains in solution. The change in liquid environment around the encapsulating agent can occur as the second liquid evaporates from the droplet, as the first and second liquids interdiffuse, or through a combination of these factors. In a different embodiment, the encapsulating agent forms a shell through cross-linking of the encapsulating agent, e.g. through photo irradiation.

In order to efficiently encapsulate the agent to be encapsulated, formation of the encapsulating shell should occur before substantial diffusion of the agent to be encapsulated out of the first fluid occurs. It has been found that miscible fluids can require more care than immiscible systems in regulating diffusion times. In some cases, it may be beneficial to increase the viscosity of the first fluid, thereby slowing diffusion of the agent to be encapsulated out of the inner core. In some cases, it may be beneficial to reduce the time needed for formation of the encapsulating shell. For encapsulating shells formed from encapsulating agents with a hydrophobic component, the encapsulating shell may be formed more quickly if the second liquid initially contains some water. In an embodiment, the upper limit on the water content of the second layer is that at which the second liquid no longer dissolves the lipid or other encapsulating agent with a hydrophobic component. In this instance, the lipids would coalesce into a bilayer before contacting the "core" fluid and would merely be in suspension (as opposed to solution). Thus, encapsulation may not occur because self-assembly happened prematurely. The encapsulating shell may also be formed more quickly if evaporation of the second liquid is enhanced. Evaporation of the second liquid can be enhanced through drying or through use of vacuum.

The first fluid comprises an agent to be encapsulated. In an embodiment, the first liquid is a carrier for the agent to be encapsulated and is capable of dissolving or suspending the agent to be encapsulated. In an embodiment, the first liquid is aqueous. The agent to be encapsulated can be a variety of materials. In an embodiment, the agent to be encapsulated is selected from the group consisting of polynucleotides, proteins, and bioactive agents. As used herein, a polynucleotide is at least 10 nucleotides in length. The polynucleotide may be found in nature, synthetic, or any modified forms thereof. The polynucleotide may be single- or double-stranded. The polynucleotide can be, but is not limited to, DNA, RNA, chemical modifications thereof (e.g., phosphorothioates, LNA), and polynucleotide complexes. Complexes incorporating polynucleotides include DNA condensates. In an embodiment, the protein is hemoglobin.

In an embodiment, the agent to be encapsulated is a bioactive agent. As used herein a bioactive agent is a substance which may be administered to any biological system, such as an organism, preferably a human or animal host, and causes some biological reaction. Bioactive agents include pharmaceutical substances, where the substance is administered normally for a curative or therapeutic purpose. In an embodiment, the bioactive agent is a water-soluble pharmaceutical. The bioactive agent can be, but is not limited to: adrenergic agent; adrenocortical steroid; adrenocortical suppressant;

aldosterone antagonist; amino acid; anabolic; analeptic; analgesic; anesthetic; anorectic; anti-acne agent; anti-adrenergic; anti-allergic; anti-amebic; anti-anemic; anti-anginal; anti-arthritic; anti-asthmatic; anti-atherosclerotic; antibacterial; anticholinergic; anticoagulant; anticonvulsant; antidepressant; antidiabetic; antidiarrheal; antidiuretic; anti-emetic; anti-epileptic; antifibrinolytic; antifungal; antihemorrhagic; antihistamine; antihyperlipidemia; antihypertensive; antihypotensive; anti-infective; anti-inflammatory; antimicrobial; antimigraine; antimitotic; antimycotic, antinauseant, antineoplastic, antineutropenic, antiparasitic; antiproliferative; antipsychotic; antirheumatic; antiseborrheic; antisecretory; antispasmodic; antithrombotic; anti-ulcerative; antiviral; appetite suppressant; blood glucose regulator; bone resorption inhibitor; bronchodilator; cardiovascular agent; cholinergic; depressant; diagnostic aid; diuretic; dopaminergic agent; estrogen receptor agonist; fibrinolytic; fluorescent agent; free oxygen radical scavenger; gastrointestinal motility effector; glucocorticoid; hair growth stimulant; hemostatic; histamine H2 receptor antagonists; hormone; hypocholesterolemic; hypoglycemic; hypolipidemic; hypotensive; imaging agent; immunizing agent; immunomodulator; immunoregulator; immunostimulant; immunosuppressant; keratolytic; LHRH agonist; mood regulator; mucolytic; mydriatic; nasal decongestant; neuromuscular blocking agent; neuroprotective; NMDA antagonist; non-hormonal sterol derivative; plasminogen activator; platelet activating factor antagonist; platelet aggregation inhibitor; psychotropic; radioactive agent; scabicide; sclerosing agent; sedative; sedative-hypnotic; selective adenosine AI antagonist; serotonin antagonist; serotonin inhibitor; serotonin receptor antagonist; steroid; thyroid hormone; thyroid inhibitor; thyromimetic; tranquilizer; amyotrophic lateral sclerosis agent; cerebral ischemia agent; Paget's disease agent; unstable angina agent; vasoconstrictor; vasodilator; wound healing agent; xanthine oxidase inhibitor.

Bioactive agents include immunological agents such as allergens (e.g., cat dander, birch pollen, house dust, mite, grass pollen, etc.) and antigens from pathogens such as viruses, bacteria, fungi and parasites. These antigens may be in the form of whole inactivated organisms, peptides, proteins, glycoproteins, carbohydrates or combinations thereof. Specific examples of pharmacological or immunological agents that fall within the above-mentioned categories and that have been approved for human use may be found in the published literature.

Experimental studies have investigated the effect of atomization on DNA structural integrity, and clearly demonstrated that the proposed electrostatic spray process does not degrade plasmid, cosmid, or linear forms of the macromolecule (Lentz et al., 2003). Electrostatic atomizers impart minimal strain rates on the fluid (Table 1), and therefore, do not degrade the molecular structure through shear forces. No degradation is observed regardless of applied voltage (1 to 10 kV) except when the charge density exceeds physical limits (as indicated by a corona discharge).

In another embodiment, the agent to be encapsulated is a food component or a cosmetic component. In an embodiment, the food component is a food additive.

The droplet size can be selected so that the agent to be encapsulated fits within the droplet. Without wishing to be bound by any particular theory, it is believed that so long as the molecule remains smaller than the interior cavity or inner core the recoil velocity imparted to the liquid filament between the droplet and liquid column during pinch off should be sufficient to force any strands of the agent to be encapsulated extending into the filament back into the droplet interior. In an embodiment, the agent to be encapsulated is DNA. It may be desirable to complex plasmid DNA to cationic agents (e.g. PEI, protamine) to condense the DNA to a smaller size. Complexation of large plasmids (approximately 300 nm in diameter) is known to condense DNA to sizes well below 100 nm. In the practice of the invention, these cationic agents would be neutralized by the DNA and fully encapsulated, thereby avoiding possible adverse interactions with blood components.

The second fluid comprises an encapsulating agent. In an embodiment, the second liquid is a carrier for the agent to be encapsulated and is capable of dissolving or suspending the encapsulating agent. The second liquid is miscible with the first liquid. The encapsulating agent can be selected from the group consisting of lipids, polymers, and polymer precursors. Useful polymers include synthetic and natural polymers. In an embodiment, the encapsulating agent can be selected from the group consisting of lipids, and polymers. Natural polymers include polysaccharides and proteins. The concentration of the encapsulating agent in the second liquid is sufficient to form a complete shell around the agent to be encapsulated.

Useful lipid encapsulating agents are amphipathic lipids capable of forming a lipid bilayer. Useful lipid encapsulating agents include phospholipids, glycolipids, lipoproteins, sulfolipids, and mixtures thereof. As used herein, phospholipids include both glycerophospholipids and sphingosyl phosphatides. Phospholipids useful in the present invention include phosphatidic acids, choline glycerophospholipids, serine glycerophospholipids, ethanolamine glycerophospholipids, phosphoinositides, sphingomyelin, and mixtures thereof. Also useful for the present invention are phospholipid derivatives including phospholipids grafted to polymers. The lipid bilayer can also incorporate sterols, proteins, glycoproteins or other agents that are either temperature- or pH-sensitive and facilitate targeting, uptake or efficacy. The lipid bilayer can be neutral or negatively-charged.

Suitable solvents for lipid encapsulating agents include organic solvents such as alcohols, acetone, DMSO, PEG, and glycerols, mixtures of organic solvents and mixtures of organic solvents with water. In an embodiment, the solvent is selected from alcohols, alcohol mixtures and alcohol-water mixtures. Suitable alcohols include, but are not limited to, ethanol, methanol and isopropanol.

In an embodiment, the encapsulating shell is formed by precipitation of the polymer upon at least partial removal of the second liquid. In this embodiment, the polymer is selected so that it is not substantially soluble in the first liquid. In an embodiment, the first liquid is aqueous and the polymer has a hydrophobic component. Useful encapsulating agents for this embodiment include both synthetic and natural polymers.

The polymer may be any suitable microencapsulation material including, but not limited to, nonbioerodable and nonbioerodable polymers. Such polymers have been described in great detail in the prior art. They include, but are not limited to: polyamides, polycarbonates, polyalkylenes, polyalkylene glycols, polyalkylene oxides, polyalkylene terepthalates, polyvinyl alcohols, polyvinyl ethers, polyvinyl esters, polyvinyl halides, polyvinylpyrrolidone, polyglycolides, polysiloxanes, polyurethanes and copolymers thereof, alkyl cellulose, hydroxyalkyl celluloses, cellulose ethers, cellulose esters, nitro celluloses, polymers of acrylic and methacrylic esters, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxyethyl cellulose, cellulose triacetate, cellulose sulphate sodium salt, poly(methyl methacrylate), poly(ethylmethacrylate), poly(butylmethacrylate), poly(isobutylmethacrylate), poly(hexylmethacrylate), poly(isodecylmethacrylate), poly(lauryl methacrylate), poly(phenyl methacrylate), poly(methyl acrylate), poly(isopropyl acrylate), poly(isobutyl acrylate), poly(octadecyl acrylate), polyethylene, polypropylene poly(ethylene glycol), poly(ethylene oxide), poly(ethylene terephthalate), poly(vinyl alcohols), poly(vinyl acetate, poly vinyl chloride polystyrene, polyvinylpyrrolidone and polyethylenimine. In an embodiment, the polymer is polyethylenimine (PEI).

Examples of preferred biodegradable and bioerodible polymers include synthetic polymers such as polymers of lactic acid and glycolic acid, polyanhydrides, poly(ortho) esters, polyurethanes, poly(butic acid), poly(valeric acid), poly(caprolactone), poly(hydroxybutyrate), poly(lactide-co-glycolide) and poly(lactide-co-caprolactone), and natural polymers such as alginate and other polysaccharides including dextran and cellulose, collagen, albumin and other proteins and peptides, zein and other prolamines and hydrophobic proteins. Also useful are chemical derivatives of the above polymers (substitutions, additions of chemical groups, for example, alkyl, alkylene, hydroxylations, oxidations, and other modifications routinely made by those skilled in the art). In general, these materials degrade either by enzymatic hydrolysis or exposure to water in vivo, by surface or bulk erosion. The foregoing materials may be used alone, as physical mixtures (blends), or as co-polymers. Preferred biodegradable polymers are poly lactides, poly lactide co-glycolides, chitosan, polylysines, polyarginines and biodegradable PEI derivatives (for example, Forrest, M. K. et al. "A Degradable Polyethylenimine Derivative with Low Toxicity for Highly Efficient Gene Delivery", Bioconjugate Chem., 2003, 14, 934-940).

In this embodiment, polymer and protein solvents will typically be a common organic solvent such as a halogenated aliphatic hydrocarbon such as methylene chloride, chloroform and the like; an alcohol; an aromatic hydrocarbon such as toluene; a halogenated aromatic hydrocarbon; an ether such as methyl t-butyl; a cyclic ether such as tetrahydrofuran; ethyl acetate; diethylcarbonate; acetone; or cyclohexane. Suitable solvents include low molecular weight polyethyleneglycol, acetone, dimethylsulfoxide, and glycerol. Suitable solvents for polysaccharide encapsulating agents include alcohols, low molecular weight polyethyleneglycol, acetone, dimethylsulfoxide, and glycerol.

In another embodiment, the polymer is an amphiphilic molecule which self assembles into a vesicle structure. Polymers of this type include diblock copolymers (Discher, B. M. et al. (1999) "Polymerosomes: Tough Vesicles Made from Diblock Copolymers", Science, 284: 1143-1146), carbohydrate-based polymers (Uchegbu, I. F. et al., (1998) "Polymeric chitosan based vesicles for drug delivery. J. Pharm. Pharmacol., 50, 453-8) and amino acid based polymers (Uchegbu, I. F. et al., (1998) "Polymeric vesicles from amino acid homopolymers", Proc. Intl. Symp. Control. Rel. Bioact. Mater. 25, 186-7).

In another embodiment, the encapsulating shell is formed by cross-linking of a polymer precursor encapsulating agent. The polymerization process can be initiated by photo-irradiation, thermally, or chemically. A polymer precursor means a molecule or portion thereof which can be polymerized to form a polymer or copolymer. Polymer precursors include any substance that contains an unsaturated moiety or other functionality that can be used in chain polymerization, or other moiety that may be polymerized in other ways. Such precursors include monomers and oligomers. Preferred precursors include those that are capable of being polymerized by photo radiation. Some examples of precursors that are useful in the invention include ethylene oxides (for example, PEO), ethylene glycols (for example, PEG), vinyl alcohols (for example, PVA), vinyl pyrrolidones (for example, PVP), ethyloxazolines (for example, PEOX), amino acids, saccharides, proteins, anhydrides, vinyl ethers, amides, carbonates, phenylene oxides (for example, PPO), acetals, sulfones, phenylene sulfides (for example, PPS), esters, fluoropolymers, imides, amide-imides, etherimides, ionomers, arylethereketones, olefins, styrenes, vinyl chlorides, ethylenes, acrylates, methacrylates, amines, phenols, acids, nitriles, acrylamides, maleates, benzenes, epoxies, cinnamates, azoles, silanes, chlorides, epoxides, lactones and amides. In an embodiment, the polymer precursor is a hydro acid, L-lactic acid, D,L-lactic acid, glycolic acid, copolymers thereof or a polyanhydride. In another embodiment, the polymer precursor is an ethylenimine.

In this embodiment, the second fluid will typically further comprise an initiator. If a polymer precursor that polymerizes photochemically is used (photosensitive polymer precursor), a separate photoinitator does not need to be used. Examples of photosensitive polymer precursors include tetramercaptopropionate and 3,6,9,12-tetraoxatetradeca-1,13-diene. Depending upon the cross-linking method, the first fluid may further comprise an agent to protect the agent to be encapsulated during the cross-linking process.

Photoinitiators that are useful in the invention include those that can be activated with light and initiate polymerization of the polymer precursor. Preferred initiators include azobisisobutyronitrile, peroxides, phenones, ethers, quinones, acids, formates. Cationic initiators are also useful in the invention. Preferred cationic initiators include aryldiazonium, diaryliodonium, and triarylsulfonium salts. Most preferred initiators include Rose Bengal (Aldrich), Darocur 2959 (2-hydroxy-1-[4-(hydroxyethoxy)phenyl]-2-methyl-1-propanone, D2959, Ciba-Geigy), Irgacure 651 (2,2-dimethoxy-2-phenylacetophenone, I651, DMPA, Ciba-Geigy), Irgacure 184 (1-hydroxycyclohexyl phenyl ketone, I184, Ciba-Geigy), Irgacure 907 (2-methyl-1-[4-(methylthio)phenyl]-2-(4-morpholinyl)-1-propanone, I907, Ciba-Geigy), Camphorquinone (CQ, Aldrich), isopropyl thioxanthone (quantacure ITX, Great Lakes Fine Chemicals LTD., Cheshire, England). CQ is typically used in conjunction with an amine such as ethyl 4-N,N-dimethylaminobenzoate (4EDMAB, Aldrich) or triethanolamine (TEA, Aldrich) to initiate polymerization.

The wavelengths and power of light useful to initiate polymerization depends on the initiator used or the wavelength (or wavelengths) which will activate the photosensitive precursor. A combination of photosensitive precursor(s) and photoinitiator(s) may be used. When Rose Bengal is used as the initiator, a visible light source is preferably used. Light used in the invention includes any wavelength and power capable of initiating polymerization. Preferred wavelengths of light include ultraviolet or visible. Any suitable source may be used, including laser sources. The source may be broadband or narrowband, or a combination.

An additional complete or partial layer of a third fluid can be formed on the outside of the second fluid layer. In an embodiment, this third fluid is aqueous. In an embodiment, the third fluid comprises a targeting and/or steric stabilizing agent which incorporates into the lipid bilayer shell. As used herein, a targeting agent facilitates cellular localization and/or uptake. Suitable targeting agents are ligands which will bind specifically to receptor sites on the surface of a target cell. Ligand-mediated targeting of liposomes is known to the art (Jones, M. N. and Chapman, D., (1995), Micelles, Monolayers and Biomembranes, Wiley-Liss, pp 126-134). Suitable targeting agents include peptides, lectins, aptamers, glycolipids, glycoproteins, viral spike glycoproteins, antibodies, lipopolysaccharides, polysaccharides, and polyarginine. In an embodiment, the targeting agent is selected from the group consisting of peptides, antibodies, lectins, sugars, and aptamers. As used herein, a steric stabilizing agent modifies stability in physiological conditions. In an embodiment, the steric stabilizing agent is selected from the group consisting of polyethyleneglycol (PEG), glycolipids, gangliosides, polyanions, polycations, hyaluronic acid, starch, dextrans, and sulfur-containing compounds.

As is known to the art, targeting agents can be conjugated to a moiety that will allow incorporation or attachment to the "shell." For example, compounds with a hydrophobic moiety can insert into lipid bilayers. Of course, these targeting agents can also be attached to hydrophilic groups on the surface.

These drop-in-drop products 30 can be collected for further processing. For example, the products 30 can be collected in any fluid that provide intact deposition of the compound droplet. Specifically the mass of the droplet must be sufficient to over come the surface tension at the interface of the collection pool. Suitable collection methods include solidification of the particle prior to impact by liquid nitrogen, and deposition in aqueous solutions. In an embodiment, for example, the application of a vacuum around the pool will increase the blowing velocity at the surface and reduce surface tension to near zero. In an embodiment, surfactants and other surface active agents may be added to the collection pool to expand the applicable fluid range. The collection bath may be grounded. After formation, the charge on the droplets may be reduced or eliminated by methods known to the art, including corona discharge and radiation. The droplets may also be dried before collection.

The cost-efficient production of vectors using the proposed electrostatic co-extrusion technique can be limited by the low flow rates used in product formation. Two techniques have been used to increase liquid flow rates; (1) air assist and (2) capillary arrays. Air assist methods have only yielded increases in flow rates of approximately 8-fold (Regele et al., 2002). In contrast, capillary arrays have an unlimited potential for scale up. Microlaminate technology could be employed to create nozzle arrays in a small space. However, it is important to realize that charged liquid streams flowing in parallel will form individual magnetic fields that may interfere with the particle formation process. Previous work by Regele et al. (2002) suggests that careful distribution of the nozzle arrays should allow us to overcome these weak magnetic interactions. If the increases in array dimensions result in large magnetic fields that are difficult to overcome with voltage potential, air assist may be required to facilitate the breakup of the liquid column, thereby reducing the magnitude of the applied voltage. In an embodiment, the methods and apparatus of the invention employ gas flow to assist in atomization of the fluids. In this embodiment, gas can be flowed external to the fluids to assist in "focussing" the fluids.

In an embodiment, the invention comprises an apparatus for electrostatically atomizing a first and a second fluid, the apparatus comprising:

a. a multiplicity of flow channel assemblies, each flow channel assembly comprising a first fluid flow channel and a second fluid flow channel; the first and second fluid flow channels of each flow channel assembly being substantially coaxial;

b. a multiplicity of peripheral conductors;

c. a ground electrode;

d. a source of electrical potential electrically connected between the ground electrode and the flow channel assemblies and conductors;

e. at least one first liquid pump in fluid communication with the first fluid flow channels of each flow channel assembly; and f. at least one second liquid pump in fluid communication with the second fluid flow channels of each flow channel assembly.

A flow channel assembly comprises the coaxial flow channels for the fluids which are electrostatically atomized during operation of the apparatus. The flow channel assembly may also be referred to as a nozzle. The flow channel assembly is electrically connected to the source of electric potential so that charge can be transferred to at least one of the fluids which flow through the flow channel assembly during operation. For example, a flow channel may be at least partially electrically conducting and the electrically conducting portion of the flow channel connected to the source of electrical potential. The flow channel may also contain an electrode which is connected to the source of electrical potential.

The flow channel assemblies are surrounded or bordered by a multiplicity of peripheral conductors, as is schematically shown in FIG. 6. In FIG. 6, the flow channel assemblies 60 are dark and the peripheral conductors 70 are light. A peripheral conductor can be a dummy flow channel or flow channel assembly which does not conduct fluid during operation of the apparatus (i.e. the flow channel or flow channel assembly is not in fluid communication with one or more liquid pumps). When the flow channel assemblies are arranged so that some of the assemblies are peripheral to others (as is FIG. 6), the peripheral conductors help to make the electric fields experienced by the peripheral flow channel assemblies more similar to those experienced by the more central flow channel assemblies.

The flow channel assemblies and peripheral conductors can be made using microfluidic fabrication techniques as are known to the art. Microfluidic fabrication techniques include standard photolithographic procedures to form structures. Precision injection molded plastics may also be used for fabrication. The feature sizes and geometries are producible by such methods as LIGA, thermoplastic micropattern transfer, resin based microcasting, micromolding in capillaries (MIMIC), wet isotropic and anisotropic etching, laser assisted chemical etching (LACE), and reactive ion etching (RIE), or other techniques known within the art of microfabrication.

The source of electrical potential provides a direct current potential difference between the ground electrode and the flow channel assemblies and the ground electrode and the peripheral conductors. In an embodiment, the apparatus uses more than one source of electrical potential. For example, it may be desirable that a different source of electrical potential be used between the ground electrode and the peripheral conductors than the ground electrode and the flow channel assemblies. In an embodiment, the source of electrical potential is a high voltage power supply. As the spacing between the flow channel assemblies decreases, the required potential difference for electrospray from the flow channel assemblies is expected to increase.

The liquid pumps supply liquid to the flow channels of the flow channel assemblies. The pumps may be of any kind known to the art which can provide controlled flow at relatively low flow rates. In an embodiment, the liquid pump is a syringe pump, peristaltic pump, gravity feed reservoir, pressure driven reservoir, or any system providing controllable flow rates with only minor oscillatory behavior.

Although the description above contains much specificity, these should not be construed as limiting the scope of the invention but as merely providing illustrations of some of the presently preferred embodiments of the invention. Thus the scope of the invention should be determined by the appended claims and the legal equivalents, rather than by the examples given. All references cited herein are hereby incorporated by reference to the extent not inconsistent with the disclosure herein.

EXAMPLES

Example 1

Formation of Aqueous Droplets Encapsulated by a Lipid Bilayer

Methylene blue (saturated) dissolved in water was flowed through the inner flow channel and egg phosphatidylcholine (0.62 mg/ml) dissolved in ethanol was flowed through the outer channel of an electrostatic atomization apparatus. The inner flow channel was an inner quartz capillary with an inner diameter of about 0.25 mm and an outer diameter of about 0.321 mm. The outer flow channel was a stainless capillary with an inner diameter of approximately 0.564 mm and an outer diameter of approximately 1.069 mm. The inner and outer flow channel were substantially coaxial. Flow rates for both solutions were about 0.3 ml/min and achieved using two syringe pumps (Harvard Apparatus, Infusion Pump, model 940). The applied voltage was approximately 5-6 kV and the orifice to ground distance was approximately 10 mm. The voltage was applied to only the inner capillary by connecting it to a metal tube.

Figure 5:
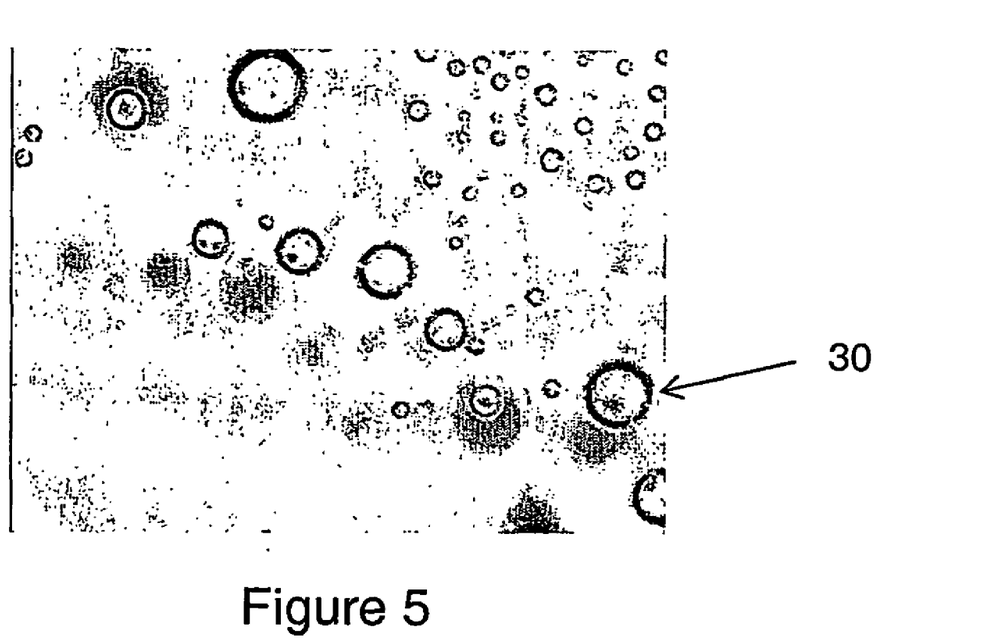
FIG. 5. illustrates water droplets (clear interior) in lipid shells (dark wall) formed through electrostatic spraying.

FIG. 5 shows a water droplet (clear interior) encapsulated in a lipid shell (dark wall) formed in this manner. The sample was collected in liquid nitrogen and then transferred to water to thaw. Images were taken after the vesicles had reached room temperature. The lipid layer is exaggerated in the image due to light diffraction. The droplet sizes in FIG. 5 are approximately 50 microns.

Example 2

Formation of Compound Droplets with an Aqueous Core and Two Outer Fluid Layers

Compound droplets were formed with a central region of methylene blue dissolved in water, an isopropanol layer surrounding the aqueous core, and a water layer surrounding the isopropanol layer. The electrostatic atomization apparatus was as described in Example 1, with the addition of an outermost flow channel. The outermost flow channel was of stainless steel piping with an inner diameter of approximately 2 mm and an outer diameter of approximately 3 mm.

TABLE 1

| | Flow rate of water in inner tube | Flow rate of isopropanol in annular space between inner and middle tube | Flow rate of water in annular space between middle and outer tube |
|---|---|---|---|
| A | 0.136 mL/min | 0.136 mL/min | 0.388 mL/min |
| B | 0.51 mL/min | 0.34 mL/min | 0.51 mL/min |
| C | 0.103 mL/min | 0.136 mL/min | 0.206 mL/min |

The applied voltage difference was approximately 5-6 kV. Flow rates were as shown in Table 1.

Five Nozzle Array

Figure 6:
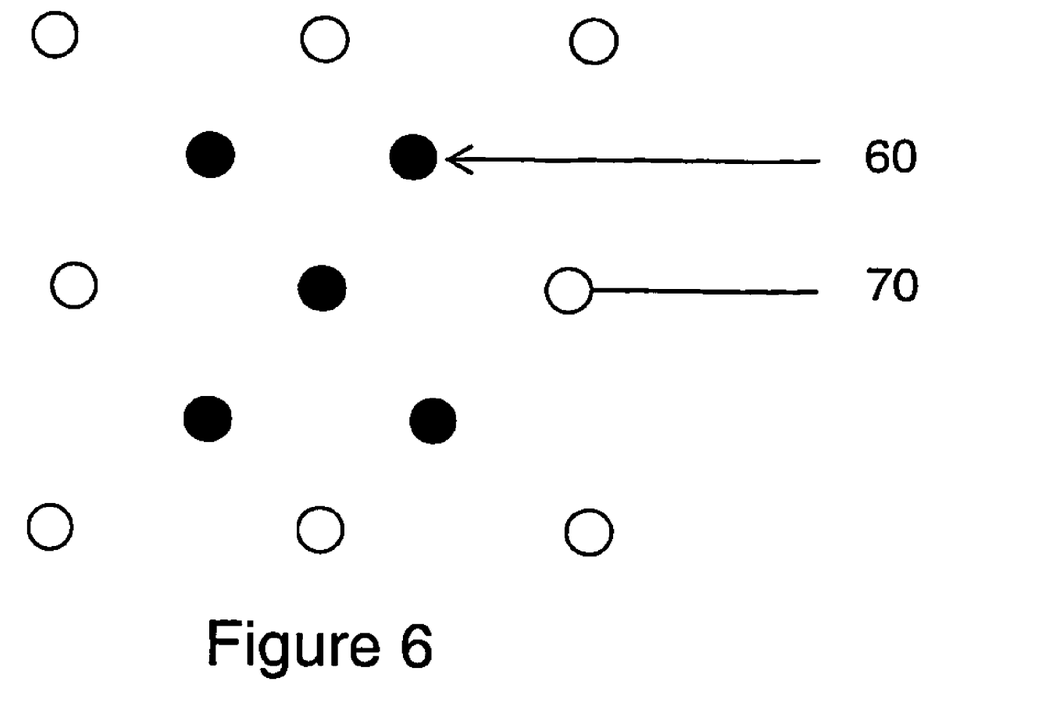
FIG. 6 is a schematic of staggered nozzle array. Filled circles represent the co-axial capillaries producing the compound droplets. Empty circles represent false charged capillaries.

FIG. 6 is a schematic of staggered nozzle array. Filled circles represent the co-axial capillaries 60 producing the compound droplets. Empty circles represent false charged capillaries 70 used to establish a uniform electric field. The five active nozzles are arranged in a staggered formation that minimizes the total space while maximizing the center to center distance between charged capillary tubes (FIG. 6). In this configuration the center capillary experiences an electric field substantially different than those on the perimeter; therefore, field uniformity is increased using dummy tubes. The dummy tubes consist of non-flowing, charged capillaries at positions consistent with the next layer in the array. This square configuration also provides an easy geometry to replicate into larger nozzle arrays (e.g., 100 by 100 nozzles). When the geometry is replicated, the pattern of five active nozzles is replicated and the resulting array of active nozzles is surrounded by dummy nozzles around the periphery.

The configuration shown in FIG. 6 has been constructed and produces Taylor cones of an aqueous solution surrounded by an alcohol.

REFERENCES

Bangham, A. D., Standish, M. M., and Watkins, J. C. *J. Mol. Biol.* 3:238-252 (1965).
Barron, L. G., Gagne, L., and Szoka, F. C. Jr. Lipoplex-mediated gene delivery to the lung occurs within 60 minutes of intravenous administration. *Human Gene Therapy* 10: 1683-1694 (1999).
Bulmus, V., Woodward, M., Lin, L., Murthy, N., Stayton, P., and Hoffman, A. A new pH-responsive and glutathione-reactive, endosomal membrane-disruptive polymeric carrier for intracellular delivery of biomolecular drugs. *J. Cont. Release* 93:105-120 (2003).
Choi, Y. H., Liu, F., Park, J. S., and Kim, S. W. Lactose-poly (ethylene glycol)-grafted poly-L-lysine as hepatoma cell-targeted gene carrier. *Bioconj. Chem.* 9: 708-718 (1998).
Dash, P. R., Read, M. L., Barrett, L. B., Wolfert, M., and Seymour, L. W. Factors affecting blood clearance and in vivo distribution of polyelectrolyte complexes for gene delivery. *Gene Therapy* 6: 643-650 (1999).
Dauty E., Remy, J. S., Blessing, T, and Behr, J. P. Dimerizable cationic detergents with a low cmc condense plasmid DNA into nanometric particles and transfect cells in culture. *J. Am. Chem. Soc.* 123:9227-9234 (2001).
De Juan, L., and de la Mora, J., Charge and Size Distributions of electrospray drops. *J. Colloid Int. Sci.* 186:280-293 (1997).
Devine, D. V., Wong, K., Serrano, K., Chonn, A., and Cullis, P. R. Liposome-complement interactions in rat serum: implications for liposome survival studies. *Biochim. Biophys. Acta* 1191:43-51 (1994).
Dischert (1999)
Fajac, I., Briand, P., Monsigny, M., and Midoux, P. Sugar-mediated uptake of glycosylated polylysines and gene transfer into normal and cystic fibrosis airway epithelial cells. *Human Gene Therapy* 10:395-406 (1999).
Faneca, H., Simoes, S., and Pedroso de Lima, M. C. Evaluation of lipid-based reagents to mediate intracellular gene delivery. *Biochim. Biophys. Acta* 1567: 23-33 (2002).
Felgner, P. L., Gadek, T. R., Holm, M., Roman, R., Chan, H. W., Wenz, M., Northrop, J. P., Ringold, G. M., and Danielsen, M. Lipofection A highly efficient, lipid-mediated DNA transfection procedure. *Proc. Natl. Acad. Sci. USA* 87:7413-7417 (1987).

Forrest (2003)

Ganan-Calvo, A. M., Generation of steady liquid micro-threads and micron-sized monodisperse sprays in gas streams, *Physical Review Letters,* 80(2):285-288 (1998)

Ganan-Calvo, A. M., On the theory of electrohydrodynamically driven capillary jets, *J. of Fluid Mechanics,* 335:165-188 (1997)

Ganan-Calvo, A. M., The surface charge in electrospraying: its nature and its universal scaling laws, *J. of Aerosol Science,* 30(7):863-872 (1999)

Gao, X. and Huang, L. Potentiation of cationic liposome-mediated gene delivery by polycations. *Biochemistry* 35:1027-1036 (1996).

Gregoriadis, G. Engineering liposomes for drug delivery: progress and problems. *Tibtech* 13:527-537 (1995).

Harvie, P., Wong, F. M. P., and Bally, M. B. Use of poly (ethylene glycol)-lipid conjugates to regulate the surface attributes and transfection activity of lipid-DNA particles. *J Pharm Sci.* 89:652-663 (2000).

Hofland, H. E., Shephard, L., and Sullivan, S. M. Formation of stable cationic lipid/DNA complexes for gene transfer. *Proc. Natl. Acad. Sci. USA* 93:7305-7309 (1996).

Jones (1995)

Lasic, D. D., Ceh, B., Stuart, M. C. A., Guo, L., Frederik, P. M., and Barenholz, Y. Transmembrane gradient driven phase transitions within vesicles: lessons for drug delivery. *Biochim. Biophys. Acta* 1239:145-156 (1995).

Lentz, Y., Worden, L., Anchordoquy, T. and Lengsfeld, C. S., Pulmonary Gene Delivery: Impact of Aerosolization Method on Bioactivity, *Journal of Aerosol Medicine,* 2003, 16(2):196

Li, S., and Huang, L. Nonviral gene therapy: promises and challenges. *Gene Therapy* 7: 31-34 (2000).

Li, S., Tseng, W-C., Stolz, D. B., Wu, S-P., Watkins, S. C., and Huang, L. Dynamic changes in the characteristics of cationic lipidic vectors after exposure to mouse serum: implications for intravenous lipofection. *Gene Ther.* 6: 585-594 (1999).

Liu, F., and Huang, L. Development of non-viral vectors for systemic gene delivery. *J. Cont. Release* 78: 259-266 (2002).

Loscertales, I. G., Barrero, A., Guerrero, I., Cortijo, R., Marquez, M., and Ganan-Calvo, A. M. Micro/Nano encapsulation via electrified coaxial liquid jets. *Science,* 295 (5560):1695-1698 (2002).

Mathiowitz, U.S. Pat. No. 6,143,211

Merrill, U.S. Pat. No. 2,275,154

Nicolazzi, C., Mignet, N., de la Figuera, N., Cadet, M., Ibad, R. T., Seguin, J., Scherman, D., and Bessodes, M. Anionic polyethyleneglycol lipids added to cationic lipoplexes increase their plasmatic circulation time. *J. Cont. Release* 88: 429-443 (2003).

Ogris, M., Brunner, S., Schuller, S., Kircheis, R., and Wagner, E. PEGylated DNA/transferrin-PEI complexes: reduced interaction with blood components, extended circulation in blood and potential for systemic gene delivery. *Gene. Therapy* 6:595-605 (1999).

Opanasopit, P., Hyoudou, K., Nishikawa, M., Yamashita, F., and Hashida, M. Serum mannan binding protein inhibits mannosylated liposome-mediated transfection to macrophages. *Biochim. Biophys. Acta* 1570: 203-209 (2002).

Oupicky, D., Ogris, M., Howard, K. A., Dash, P. R., Ulbrich, K., and Seymour, L. W. Importance of lateral and steric stabilization of polyelectrolyte gene delivery vectors for extended systemic circulation. *Mol. Therapy* 5:463-472 (2002).

Papahadjopoulos, D., Allen, T. M., Gabizon, A., Mayhew, E., Matthay, K., Huang, S. K., Lee, K. D., Woodle, M. C., Lasic, D. D., Redemann, C., and Martin, F. J. Sterically stabilized liposomes—improvements in pharmacokinetics and antitumor therapeutic efficacy. *Proc. Natl. Acad. Sci. (USA)* 88:11460-11464 (1991).

Plank, C., Mechtler, K., Szoka, F. C. Jr., and Wagner, E. Activation of the complement system by synthetic DNA complexes: a potential barrier for intravenous gene delivery. *Hum. Gene Ther* 7:1437-1446 (1996).

Pollard, H., Remy, J. S., Loussouarn, G., Demolombe, S., Behr, J. P., and Escande, D. Polyethylenimine but not cationic lipids promotes transgene delivery to the nucleus in mammalian cells. *J. Biol. Chem.* 273: 7507-7511 (1998).

Raley, U.S. Pat. No. 2,766,478

Regele, J. D., Papac, M. J, Rickard, M. J. A., and Dunn-Rankin, D. "Experimental Study of a Hybrid Electrohydrodynamic, Air-Assisted Liquid Atomizer, SAE Document Number": 2002-01-2754, (2002a) Presented at: SAE Powertrain & Fluid Systems Conference & Exhibition, October 2002, San Diego, Calif., USA.

Regele, J. D., Papac, M. J., Rickard, M. J. A., and Dunn-Rankin, D. Effects of capillary spacing on EHD spraying from an array of cone jets, *Journal of Aerosol Science* 33(11):1471-1479 (2002b).

Riess, J G. Oxygen carriers ("blood substitutes")—raison d'etre, chemistry, and some physiology, *Chem. Rev.* 2001, 101:2797-2919

Rosell-Llompart, J., and de la Mora, J. F., Generation of monodisperse droplets 0.3 to 4 μm in diameter from electrified con-jets of highly conducting and viscous liquids. *J. of Aerosol Science,* 25(6):1093-1119 (1994)

Semple, S. C., Klimuk, S. K., Harasym, T. O., Santos, N. D., Ansell, S. M., Wong, K. F., Maurer, N., Stark, H., Cullis, P. R., Hope, M. J., and Scherrer, P. Efficient encapsulation of antisense oligonucleotides in lipid vesicles using ionizable aminolipids: formation of novel small multilamellar vesicle structures. *Biochim. Biophys. Acta* 1510:152-166 (2001).

Somerville, G. R. U.S. Pat. No. 3,015,128 (1960) "Multiorifice centrifugal head"

Somerville, G. R. U.S. Pat. No. 3,310,612 (1967) "Sloped head"

Somerville, G. R. U.S. Pat. No. 3,389,194 (1968) "Methods for mass producing small spherical particles".

Tam, P., Monck, M., Lee, D., Ludkovski, O., Leng, E. C., Clow, K., Stark, H., Scherrer, P., Graham, R. W., and Cullis, P. R. Stabilized plasmid-lipid particles for systemic gene therapy. *Gene Therapy* 7:1867-1874 (2000).

Torchilin, V. P., Omelyanenko, V. G., Papisov, M. I., Bogdanov, A. A. Jr., Trubetskoy, V. S., Herron, J. N., and Gentry, C. A. Poly(ethylene glycol) on the liposome surface: on the mechanism of polymer-coated liposome longevity. *Biochim. Biophys. Acta* 1195:11-20 (1994).

Trubetskoy, V. S., Wong, S. C., Subbotin, V., Budker, V. G., Loomis, A., Hagstrom, J. E., and Wolff, J. A. Recharging cationic DNA complexes with highly charged polyanions for in vitro and in vivo gene delivery. *Gene Therapy* 10: 261-271 (2003).

Uchegbu (1998a/b)

Yamaguchi, Y., Takenaga, M., Kitagawa, A., Ogawa, Y., Mizushima, Y., and Igarashi, R. Insulin-loaded biodegradable PLGA microcapsules: initial burst release controlled by hydrophilic additives. *J. Cont. Release* 81: 235-249 (2002).

Yang, J. P. and Huang, L. Overcoming the inhibitory effect of serum on lipofection by increasing the charge ratio of cationic liposome to DNA. *Gene Therapy* 4:950-960 (1997).

Yew, N. S., Przybylska, M., Ziegler, R. J., Liu, D., and Cheng, S. H. High and sustained transgene expression in vivo from plasmid vectors containing a hybrid ubiquitin promoter Mol. Therapy 4:75-82 (2001).

Zabner, J., Fasbender, A. J., Moninger, T., Poellinger, K. A., and Welsh, M. J.). Cellular and molecular barriers to gene transfer by a cationic lipid. *J. Biol. Chem.* 270:18997-19007 (1995).

The invention claimed is:

1. A method for making an encapsulated droplet comprising an agent to be encapsulated, the method comprising the steps of:
    a. forming a compound droplet through electrostatic atomization of a first and a second liquid, the compound droplet comprising a droplet of the first liquid surrounded by a layer of the second liquid, wherein the first liquid is aqueous and comprises an agent to be encapsulated, the second liquid comprises a lipid encapsulating agent and an organic solvent, the organic solvent being selected so that the second liquid is miscible with the first liquid and at least one of the first or second liquid is electrically conductive; and
    b. forming an encapsulating shell from the encapsulating agent, thereby forming an encapsulated droplet comprising an agent to be encapsulated
    wherein the compound droplet is formed by flowing the first liquid through a first inner fluid flow channel having a first outlet and by flowing the second liquid through a second fluid flow channel having a second outlet, the first outlet being flush with or downstream of the second outlet, the first and second fluid flow channels being coaxial, applying electrical charge to the electrically conducting liquid and maintaining laminar flow of the first and second liquids at the first and second outlets.

2. The method of claim 1, wherein both the first and the second liquid are electrically conducting and electrical charge is applied to both of the liquids.

3. The method of claim 1 wherein the agent to be encapsulated is a bioactive agent.

4. The method of claim 1, wherein the agent to be encapsulated is selected from the group consisting of pharmaceuticals, polynucleotides, and proteins.

5. The method of claim 4, wherein the agent to be encapsulated is a polynucleotide selected from the group consisting of DNA, RNA, chemically modified polynucleotides and complexes containing polynucleotides.

6. The method of claim 1, wherein the agent to be encapsulated is a food component or cosmetic component.

7. The method of claim 1, wherein the organic solvent is an alcohol.

8. A method for making an encapsulated droplet comprising an agent to be encapsulated, the method comprising the steps of:
    a. forming a compound droplet through electrostatic atomization of a first, a second, and a third liquid, the compound droplet comprising a droplet of the first liquid surrounded by a layer of the second liquid with the third liquid forming a complete or partial layer around the second liquid, wherein the first liquid is aqueous and comprises an agent to be encapsulated, the second liquid comprises a lipid encapsulating agent and an organic solvent, the organic solvent being selected so that the second liquid is miscible with the first liquid and the third liquid comprises a targeting or steric stabilizing agent and at least one of the liquids is electrically conductive; and
    b. forming an encapsulating shell from the encapsulating agent, thereby forming an encapsulated droplet comprising a first agent to be encapsulated
    wherein the compound droplet is formed by flowing the first liquid through a first inner fluid flow channel having a first outlet, by flowing the second liquid through a second fluid flow channel having a second outlet, and by flowing the third liquid through a third flow channel having a third outlet, the first outlet being flush with or downstream of the second and third outlets, the first, second and third fluid flow channels being coaxial and applying electrical charge to the electrically conductive liquid and maintaining laminar flow of the first and second liquids at the first and second outlets.

9. The method of claim 8 wherein electrical charge is applied to the first and the second liquids.

10. The method of claim 8 wherein the third liquid is miscible with the second liquid.

11. The method of claim 8 wherein the third liquid is aqueous.

12. The method of claim 8 wherein the targeting agent is selected from the group consisting of: peptides, antibodies, lectins, sugars, and aptamers.

13. The method of claim 8 wherein the steric stabilizing agent is selected from the group consisting of polyethyleneglycol, glycolipids, gangliosides, polyanions, polycations, hyaluronic acid, starch, dextrans, and sulfur-containing compounds.

14. The method of claim 1, wherein the walls of the second flow channel converge near the second outlet.

15. The method of claim 1, wherein the flow of the first and second liquids establishes a velocity field in each liquid, and the velocity fields of the first and second liquids at each outlet are matched.

16. The method of claim 1, wherein intact encapsulated droplets are collected in a liquid pool.

17. The method of claim 8, wherein the flow of the first and second liquids establishes a velocity field in each liquid, and the velocity fields of the first and second liquids at each outlet are matched.

18. The method of claim 1, wherein the first and second liquids are completely miscible.

19. The method of claim 1, wherein the encapsulating shell forms at least in part through interdiffusion of the first and second liquids.

20. The method of claim 1, wherein the encapsulating agent is selected from the group consisting of phospholipids, glycolipids, lipoproteins, sulfolipids and mixtures thereof.

21. The method of claim 1, wherein the encapsulating agent is a phospholipid derivative.

22. The method of claim 8, wherein the organic solvent is an alcohol.

23. The method of claim 8, wherein the first and second liquids are completely miscible.

24. The method of claim 8, wherein the encapsulating shell forms at least in part through interdiffusion of the first and second liquids.

25. The method of claim 8, wherein the encapsulating agent is selected from the group consisting of phospholipids, glycolipids, lipoproteins, sulfolipids and mixtures thereof.

26. The method of claim 8, wherein the encapsulating agent is a phospholipid derivative.

* * * * *

UNITED STATES PATENT AND TRADEMARK OFFICE
CERTIFICATE OF CORRECTION

| | |
|---|---|
| PATENT NO. | : 7,914,714 B2 |
| APPLICATION NO. | : 10/555432 |
| DATED | : March 29, 2011 |
| INVENTOR(S) | : Thomas J. Anchordoquy et al. |

Page 1 of 1

It is certified that error appears in the above-identified patent and that said Letters Patent is hereby corrected as shown below:

Column 1, line 73 on Cover Sheet, please ADD Assignee:
COLORADO SEMINARY, which owns and operates THE UNIVERSITY OF DENVER, Denver, Colorado Page 2, Foreign Patent Documents section, please add:
EP   EP1364718

Signed and Sealed this
Twelfth Day of February, 2013

Teresa Stanek Rea
*Acting Director of the United States Patent and Trademark Office*